United States Patent [19]

Theriault

[11] 4,045,842
[45] Sept. 6, 1977

[54] DETACHABLE HANDLE FOR AIDING IN THE MANIPULATION OF TRANSPORT CARTS

[76] Inventor: Roland Theriault, 123 Babbs Road, West Suffield, Conn. 06093

[21] Appl. No.: 714,105

[22] Filed: Aug. 13, 1976

[51] Int. Cl.² .............................................. B60D 3/00
[52] U.S. Cl. ........................... 16/114 R; 280/47.37 R; 280/79.3
[58] Field of Search ........................ 16/114 R, 111 R; 280/47.37 R, 47.34, 79.3, 79.2

[56] References Cited

U.S. PATENT DOCUMENTS

| 1,144,957 | 6/1915 | Andree | 280/47.34 |
| 2,339,646 | 1/1944 | Mann | 16/114 R |
| 2,931,078 | 4/1960 | Beyrle | 16/111 R |
| 3,572,764 | 3/1971 | Rubin | 280/47.37 X |
| 3,619,852 | 11/1971 | Eckberg | 16/114 |

FOREIGN PATENT DOCUMENTS 339,060  7/1959  Switzerland ..................... 280/79.3

Primary Examiner—Andrew V. Kundrat
Attorney, Agent, or Firm—Ross, Ross & Flavin

[57] ABSTRACT

A detachable maneuvering handle for a transport cart, the handle having outwardly extending inboard and outboard clamps projecting from a main support bar wherein either the inboard or outboard clamps or both may be readily fitted to the sides of the vertical corner legs of an end member of the transport cart, the handle having bearing means likewise projecting outwardly relative to the main support bar which may be readily fitted to a selected one of the horizontal cross members extending between the corner legs, in end members having such horizontal cross members, for purposes of serving as a handle by means of which the transport cart can be more easily manipulated.

5 Claims, 5 Drawing Figures

DETACHABLE HANDLE FOR AIDING IN THE MANIPULATION OF TRANSPORT CARTS

The detachable manipulating handle of this invention is adapted for ready attachment to and detachment from transport carts of the types used in warehousing.

Such transport carts, as may be known, are usually of a construction such as to permit their easy passage through the narrow aisles of a warehouse for ready loading thereto and unloading therefrom.

The wheeled carts are used by warehousers to deliver products to their customers, for example to retail stores. Cartons containing the products are loaded on carts by the warehouser, the loaded carts are rolled on the trailer of a truck and delivered to the retail store. In the store, each cart is rolled to the place or places where the products are to be displayed and then they are placed on the shelves or counters for display to the consumer.

The empty carts are stored in a storage area of the store until additional products are ordered from the warehouser, and when he delivers the additional products, he picks up the empty carts and returns them to the warehouse for use in subsequent shipments.

The floor areas required to store the empty carts at the retailer's and at the warehouser's places of business and also the truck trailer area necessary to return them to the warehouse are very extensive and such aggravates the storage and transportation costs in connection with such a system.

Accordingly, the carts have been designed primarily so as to reduce the storage area and the vehicle transportation area which is necessary to store or transport a plurality of carts. With this worthy desideratum in mind, the carts have been designed which are of rectangular-like configuration with squared off corners and without handles or the like for the convenience of the workers who are required to push and pull these carts throughout their working days.

Such carts are usually provided only with so-called upstanding end members at the forward and rearward ends of the truck and such panels usually are provided with opposite corner legs with horizontally or vertically extending spindles therebetween.

One object hereof is to provide a detachable handle which may be readily attached to or detached from these carts for aiding in the manipulation thereof, it being understood that the average workman in the course of his work day will work with anywhere from 50 to 200 different carts. The desirability of having a tool which he can quickly and easily attach to a cart as he commences work therewith and as quickly and easily detach from that cart as he finishes his work therewith is obvious.

Each assembled cart comprises a platform member having a substantially flat supporting surface, a plurality of rollers mounted beneath the platform member for rotation about axes which are substantially parallel to its surface, end supporting means attached to opposite ends of the platform member, and a pair of end members, one at each end of the platform member. Each end member is detachably supported by end-supporting means in a plane which is substantially normal to the flat surface of the platform member. The end members can be detached quickly and easily by one man who merely moves them upwardly and away from the end-supporting means.

The handle of this invention can be readily and quickly attached to and detached from an end member. In the drawings.

Figure 1:
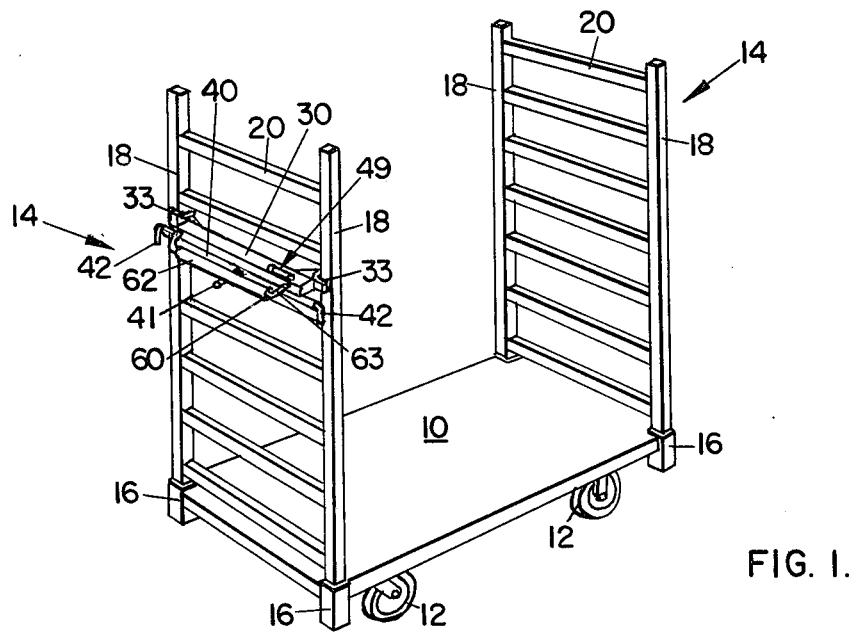
FIG. 1 is a view in perspective of a transport cart having one form of end member with which the handle of the invention is used.
Figure 2:
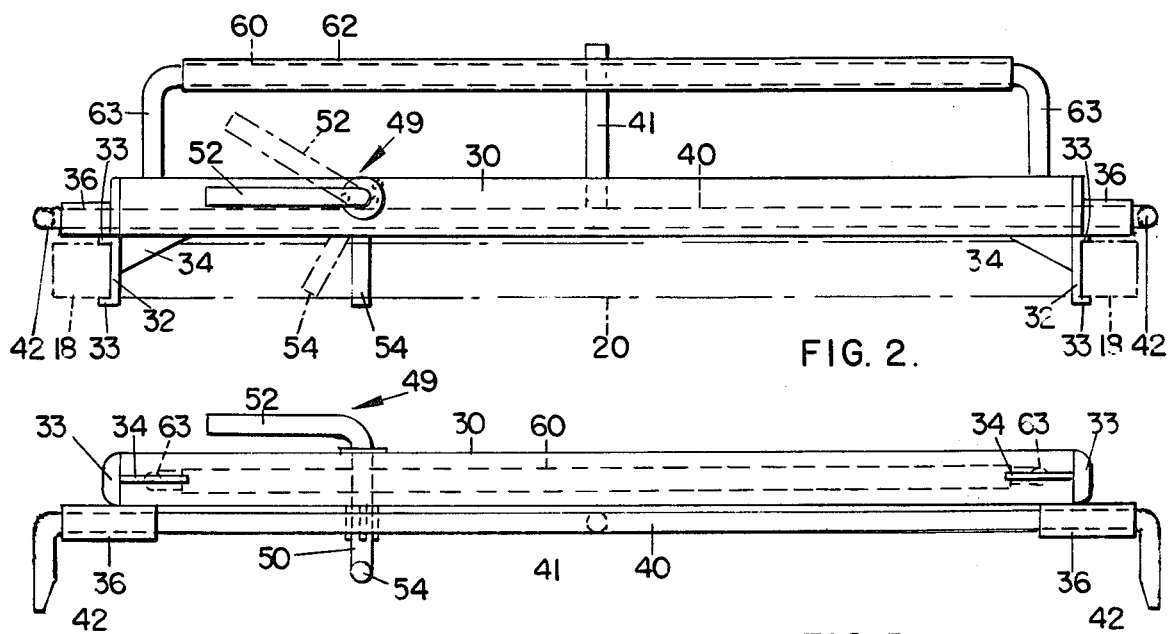
FIG. 2 is a view in top plan showing the handle of the invention.
Figure 3:
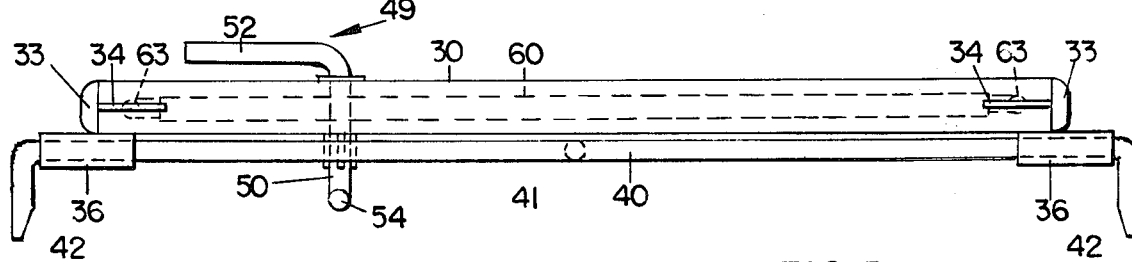
FIG. 3 is a view in side elevation of the FIG. 2 handle.
Figure 4:
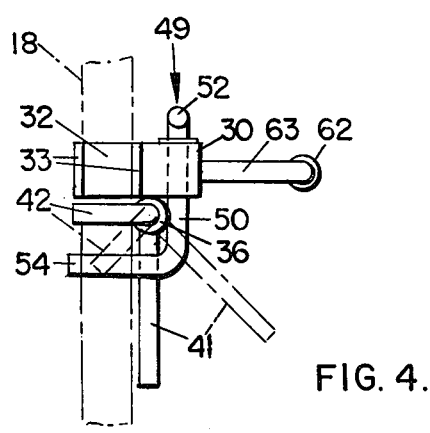
FIG. 4 is a view in end elevation showing the FIG. 2 handle.

As illustrated in FIG. 1, the usual warehouse transport cart includes a platform 10 having a substantially flat surface for supporting the products sold by the warehouser to its customers, which may be packaged in cartons for convenience in stacking.

Pairs of rollers 12 are supported downwardly of the platform for rotation about axes which are substantially parallel to the upper flat surface of the platform.

A pair of end members 14 are detachably supported by hollow end supporting members 16, the lower ends of corner legs 18 of the end members being slidably received in the supporting members as shown.

Between corner legs 18 of the end members of the cart of FIG. 1, a plurality of spaced, horizontally-extending cross members 20 may be provided.

As presently advised, the workmen push or pull the carts by grasping corner legs 18 or cross members 20 and, because of the aforesaid squareness of the carts, with the complete absence of bumper rails, guard rails and the like, the workmen frequently find their hands or fingers being jammed between a cart and the warehouse shelving or the goods as the cart unexpectedly slides or rolls during loading or off-loading. The per annum number of injuries thus sustained by warehousemen is staggering.

It is to the correction of this evil that this invention is directed.

The handle comprises essentially a main support bar 30 provided at each opposite end with a transversely-extending outwardly-projecting inboard clamp 32 fixedly secured thereto and reinforced relative thereto desirably by interconnecting gussets 34.

The ends of the inboard clamps are provided with offset cheeks 33 for embracement around the adjacent inboard corners of a respective corner leg 18.

The corner legs being so embraced, it is then appropriate to next embrace one of the cross members 20 of the end member to ensure against the unwanted raising or lowering of the handle relative to the end member by way of any position shifting and this is accomplished by the provision of a swingable lock 49 including a central arm 50 which is extendable vertically through and journalled in a suitable opening through main support bar 30 and an upper operator arm 52 extending outwardly from one end thereof and in right angular relationship therewith and a lower locking arm 54 extending outwardly from the opposite end thereof and in right angular relationship therewith and right angular to the axis of the upper operator arm as well.

Upper operator arm 52 is swingable in manner such that lower locking arm 54 may be moved into and out of a bearing relationship with the lower face of the selected one of the cross members 20 of the end member.

An easily manageable hand grip 60, which may or may not be provided with a rubber or plastic or like covering member 62, extends outwardly from and is fixed to main support bar 30 at its opposite ends by means of offset terminals 63, the free outer ends of which are fixedly secured to the main support bar.

Figure 5:
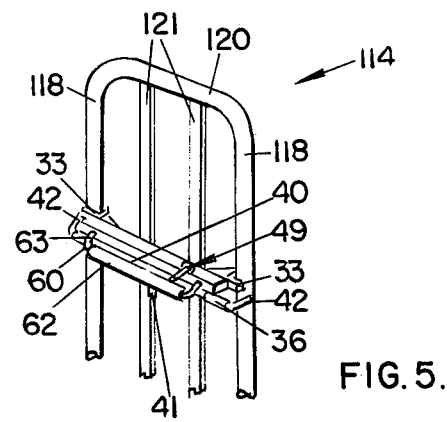
FIG. 5 is a view in perspective of another form of end member of a transport cart with which the handle of the invention may be used.

In carts having end members without horizontal cross arms, such as the type shown in FIG. 5, some means must be provided for clamping the handle onto the end members.

For such, a rodlike member 40 is supported downwardly of and by main support bar 30 and clamps 32, 32, by means of suitably aligned bosses 36 projecting outboard of each inboard clamp 32, the rodlike member 40 being provided with opposite outboard clamps 42 at its opposite ends, said clamps being merely outwardly turned free end portions bent into right angular relationship with the longitudinal axis of the main body portion of the rodlike member.

Clamps 42 are intended for use with cart end members 114 of the type shown in FIG. 5 and comprising upright tubular corner legs 118 connected at their upper ends by a horizontally-disposed upper cross member 120, and having spaced struts 121 which extend vertically between the upper cross member 120 and a lower cross member, not shown.

By manipulating rodlike member 40, outboard clamps 42 may be rotated into and out of a clamping relationship with the opposite corner legs 118 of the end member 114 of the travel cart.

By rotating rodlike member 40 away from clamping relationship, it is possible to bring the tool handle to the end member so as to embrace the inside cheek of each corner leg 118 with a respective one of the inboard clamps 32, and then to rotate the rodlike member so that the outboard clamps 42 are then rolled into embracement with the outside cheek of a respective one of the corner legs, the rotation being aided, if desired, by the manual engagement of a centrally located rotating member 41 fixed to the rodlike member 44, wherefore the rod is rotated more easily and the outboard clamps are rotated unisonly.

The inboard and outboard clamps grip the corner legs securely so that the handle will not move upwardly or downwardly as the hand grip 60 is grasped while pushing or pulling a cart.

When the handle is used with a cart end member 114 of the type shown in FIG. 5, the swingable lock member 49 will not be used, in which case the lower locking arm 54 thereof is swung to a non-use position in which it is parallel with main support bar 30.

When the handle is used with a rigid cart end member 14 of the type shown in FIG. 1, the outer clamp members 42 will ordinarily not be used, they being swung to a non-use position in which they are vertically disposed.

Of course, it should be understood that in certain instances when the handle is used with end members having horizontal braces, it may be desirable to use not only the lock member 49, but also both the inboard and outboard clamps 32 and 42 respectively for added rigidity.

I claim:

1. In a detachable handle for a transport cart of the type having upstanding end members with vertical corner legs having horizontal cross members extending therebetween, the combination of: a main support bar, inboard and outboard clamps projecting outwardly from the ends of the support bar for gripping the vertical corner legs of the transport cart, and bearing means projecting outwardly relative to the main support bar for gripping a selected one of the cross members.

2. A detachable handle according to claim 1, including means mounting the bearing means for rotation relative to the main support bar and movement into and out of gripping relation with the selected one of the cross members.

3. A detachable handle according to claim 1, wherein the inboard clamp is provided with offset wing portions for gripping the corner legs.

4. A detachable handle according to claim 1, including means mounting the outboard clamps for rotation relative to the main support bar for moving the outboard clamps into and out of gripping relation with the corner legs.

5. A detachable handle according to claim 1, including a hand grip extending outwardly from the main support bar.

* * * * *